United States Patent [19]

Brown et al.

[11] 3,949,172

[45] Apr. 6, 1976

[54] TELEPHONE EXTENSION SYSTEM UTILIZING POWER LINE CARRIER SIGNALS

[76] Inventors: William M. Brown, 2 Baron Park Lane, Apt. 33, Burlington, Mass. 01803; John M. Ruddy, 42 Pantry Road, Sudbury, Mass. 01776; Robert T. Dunn, 4 Cedar Ridge Drive, Bedford, Mass. 01730

[22] Filed: Feb. 8, 1974

[21] Appl. No.: 440,830

[52] U.S. Cl. ............................................. 179/2.5 R
[51] Int. Cl.² ........................................ H04M 11/00
[58] Field of Search ...................... 179/2.5 R, 2 E, 4

[56] References Cited
UNITED STATES PATENTS 3,280,259 10/1966 Cotter ............................. 179/2.5 R
3,475,561 10/1969 Krasin et al. .................... 179/2.5 R Primary Examiner—Kathleen H. Claffy
Assistant Examiner—C. T. Bartz
Attorney, Agent, or Firm—Robert T. Dunn

[57] ABSTRACT

An extension telephone system communicates with a conventional subscriber telephone line where the subscriber's line telephone is located, through available AC power wires which carry signals that may be modulations of RF carrier frequencies and which are coupled to the power wires. Incoming telephone line signals are detected and modulate a first RF carrier frequency which is coupled to the AC power wires at the line telephone location and these signals are coupled from the AC power wires at an extension telephone location, and, demodulated and fed to an extension telephone which is energized by DC power derived from the AC power wires at the extension location. The extension telephone produces extension telephone signals which modulate a second RF carrier frequency which is coupled to the AC power wires at the extension location and this modulated carrier is coupled from the AC power wires and demodulated at the line telephone to produce the extension telephone signals in suitable form for applying to the telephone line. Thus, telephone calls to the subscriber's line telephone can be received by the extension telephone and calls to the telephone extension telephones can be connected to this system wherever there is access to the same AC power wires.

18 Claims, 7 Drawing Figures

TELEPHONE EXTENSION SYSTEM UTILIZING POWER LINE CARRIER SIGNALS

BACKGROUND OF THE INVENTION

This invention relates to telephone extension systems providing a portable or mobile extension telephone which communicates over AC power wires. More particularly, the present invention provides apparatus for communicating over AC power wires between an extension telephone and a conventional telephone line.

Heretofore, it has been propsed to provide an extension telephone system communicating with a conventional on line telephone through transmission means other than an extending telephone line. Various wired and wireless telephone extension systems have been proposed. The wireless systems consist of transmitting and receiving radios at the on line telephone (which connects directly to the telephone line) and at the extension telephone (which is portable). These systems encounter unique problems relating to the power and frequency of radiated signals as well as other problems of signal loss between the on line and extension phones due to physical shielding between them. Furthermore, since all signals between the on line and extension telephones are transmitted, they can be intercepted freely by anyone within range.

The wired telephone extension systems that have been proposed make use of the AC power lines for communicating between the on line and the extension telephones. In these wired extension telephone systems making use of the AC power lines, the subscriber's on line telephone which is connected directly to the telephone line, is specially equipped with an acoustical speaker that sends audio signals to the on line telephone mouthpiece. These acoustical devices are contained in an auxiliary unit that goes alongside the on line telephone and which holds the telephone handset. A lever extends from this auxiliary unit to the cradle of the on line telephone where the handset usually rests, and actuates the operating button on that cradle which is usually actuated when the handset is manually lifted from or placed on the cradle. These acoustical devices communicate electrically with the mouthpiece and earpiece on the handset of the extension telephone, through the available AC power wires. This prior system uses carrier frequencies which are modulated by the acoustical signals. When this system is in use, an incoming telephone call can be answered at the extension telephone as well as at the on line telephone. However, the incoming call can not be answered at both the on line and the extension telephones, because when the on line handset is removed from the auxiliary unit, the acoustical couplings are broken and so the extension telephone is incapable of either receiving or transmitting to the on line telephone. Furthermore, the acoustical microphone in the auxiliary unit will pick up surrounding noise as well as the incoming voice signals that appear at the earpiece of the on line telephone handset and this noise will be transmitted along with the incoming voice signals over the AC power line to the extension telephone. Another shortcoming of this prior system is that calls cannot be placed by the extension telephone. There is no way provided for transmitting dial signals or dial tones from the extension phone to the subscriber's telephone line.

SUMMARY OF THE INVENTION

In accordance with the present invention, communication with a subscriber's conventional telephone line is extended to an extension telephone through available AC power wires at the subscriber's home or office. This extension communication system includes electrical circuits which connect directly to the telephone line and detect signals normally carried on the telephone line. These detected signals from the circuits are applied to a modulator which modulates a first RF carrier frequency, (called the master carrier frequency), producing modulated master carrier signals which are coupled to the available AC power wires at one location thereof, (referred to herein as the master station), so that the power wires carry the modulated master carrier signals to other stations connected to the AC power wires, (referred to herein as extension stations), where the modulated carrier signals are detected and demodulated to produce signals equivalent to the signals carried on the telephone line. These equivalent signals at an extension station are fed to an extension telephone so that the extension telephone can communicate with the telephone line.

In one preferred embodiment of the present invention, it is further provided that signals generated at the extension telephone modulate a second RF carrier frequency, (called the extension carrier frequency), which is coupled to the AC power wires at the extension station and these are coupled from the AC power wires at the master station, then demodulated and converted into suitable form for applying to the telephone line. The signals from the extension telephone include voice signals and dialing signals, and so there is two way voice communication between the extension telephone and the telephone line and the extension telephone can place calls on the telephone line.

In all embodiments of the present invention, the electrical circuits which connect directly to the telephone line impose an impedance on the telephone line which is equivalent to the impedance imposed on the line by a conventional telephone connected thereto. Furthermore, the extension system is operable with or without a conventional telephone on the telephone line. In addition, any number of additional extension telephones may communicate with the telephone line in the same manner, and all may receive the same transmitted carrier frequency from the master station and all may transmit back to the master station simultaneously, provided the different extension carrier frequencies are spaced apart sufficiently.

In a system incorporating the present invention where a number of extension telephones are provided, each transmitting a different extension carrier frequency, and extension telephones will not detect each other directly. More particularly, voice signal modulations on the extension carrier frequency from one extension telephone will not feed directly through the AC power wires from that one extension phone to another extension phone. Instead, each extension phone will transmit voice and dial signals on its own carrier frequency and these are carried by the AC power wires to the master station where these voice and dialing signals are detected and coupled in suitable form to the telephone line. The same signals from both extensions, so coupled to the telephone line, are detected at the master station and modulate the master carrier frequency which is coupled to the AC power wires and carried to the extension phones. Thus, the extension phones communicate with each other through the master station and the telephone line.

It is one object of the present invention to provide a telephone extension system wherein at least some of the disadvantages of the prior telephone extension systems, both the wired and the wireless systems, are avoided.

It is another object to provide an extension telephone system communicating via the available AC power wires with a conventional on line telephone.

It is another object to provide an extension telephone system communicating with a conventional telephone line through available AC power wires, which does not require a telephone connected to the telephone line.

It is another object to provide an extension telephone system communicating with a conventional on line telephone through available AC power wires where no connections either electrical, mechanical or acoustical are required to the on line telephone.

It is a further object in conjunction with the foregoing to provide such a system wherein there is no acoustical coupling between the on line and the extension telephones.

It is a further object to provide a signal carrier system for direct communication with a conventional telephone line that will pick up signals on the telephone line and transmit them through available AC power wires to an extension telephone at a remote location which connects to the same AC power wires.

It is a further object in conjunction with the foregoing to provide such an extension telephone as a compact portable unit equipped with a conventional AC power plug for connection to the AC power wires at any conventional outlet thereof.

It is a further object in conjunction with the above to provide such an extension telephone which is operable to receive incoming telephone calls on the telephone line or to place calls to the telephone line as is done with the on line telepphone, with or without a conventional telephone on the telephone line.

It is a further object in conjunction with the foregoing to provide such an extension telephone system wherein the impedance imposed on the telephone line by the system is the same as would be imposed by a conventional on line telephone connected thereto.

It is another object to provide an extension telephone system wherein a telephone call between the subscriber and another can be put in a hold situation from the subscriber's extension telephone and the extension telephone can then be disconnected and reconnected to the system to continue the call.

Other objects, features and advantages of the present invention will become apparent in view of the following descriptions of specific embodiments which represent the best known uses of the invention, described herein with reference to the drawings.

DESCRIPTION OF EMBODIMENTS OF THE INVENTION

An embodiment of the present invention incorporating substantially all the features of the invention includes one or more extension telephones, each equipped with an extension transmit-receive unit (extension TR unit) enabling the extension phone to couple directly to the available AC power wires, and a master transmit-receive unit (master TR unit) at the master station which connects directly to the available AC power wires and also couples to the telephone line on which there is a conventional on line telephone. This system is illustrated pictorially in FIG. 1. The master TR unit serves as an interface between the subscriber's line and the available AC power wires. These power wires act as a transmission medium for the signals on the telephone line and, in effect, carry these signals to the extension telephone stations and also carry signals from the extension telephone stations to the telephone line. Any number of extension telephones may be used in this system, each transmitting a different extension carrier frequency, and to initiate operation, it is only required that the extension TR unit of the extension telephone be plugged into the AC power wires. Thus, every AC power outlet connected to the power wires can be used as an extension telephone station. With this system in operation, all telephone line signals at the subscriber's telephone line are fed to the extension telephones which are plugged into the AC power wire. Furthermore, by virtue of the operation of the extension and master TR units, calls can be placed by the subscriber on the telephone line from any of the extension stations which are plugged in, and any extension station can communicate directly with the telephone line whether or not the subscriber's conventional telephone is connected to the line. In addition, extension stations which are plugged into the AC power wires can communicate with each other without any actuation or use of the subscriber's conventional on line telephone at the master station. Also, a call can be held by the extension telephone and the extension phone can be unplugged (disconnected from the system), moved and plugged in again to continue the call.

Figure 1:
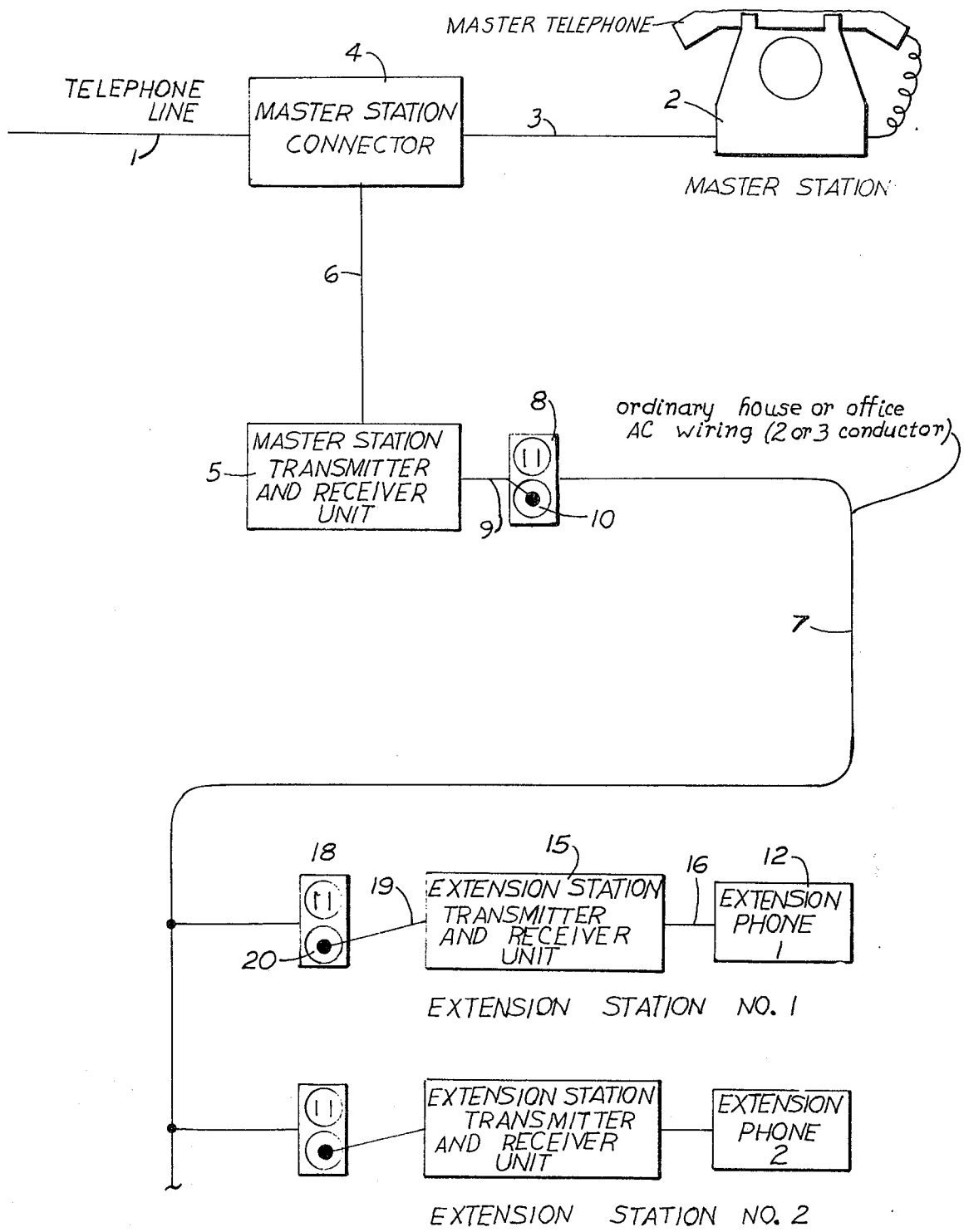
FIG. 1 is a pictorial representation of an extension telephone system including two extension telephones which communicate with a conventional telephone line via available AC power wires and a conventional on line telephone which communicates with the same telephone line.

Turning to FIG. 1, there is shown the subscriber's telephone line 1 and the subscriber's on line telephone 2 (herein called the master telephone). Both the telephone line and the master telephone are of conventional design and are usually provided by the local telephone company. For purposes of example, the telephone system described herein is a conventional system sometimes referred to as a common battery telephone system which provides a telephone line to each subscriber. The subscriber's telephone is on the line at all times and is energized by direct current over the telephone line from a central telephone switching system which may be a PBX, panel, step by step, crossbar or electronic switching system.

In a preferred embodiment of the present invention, both the telephone line 1 and the line 3 from the master telephone connect together through a master station connector 4. This connector is merely a feed through with respect to lines 1 and 3. In addition, the connector provides telephone line connection to the master station TR unit 5. This connection is line 6 and may be no different than the telephone line connection to a conventional telephone line extension phone. Hence, the connector 4 may be a conventional telephone extension receptacle.

The master station TR unit, connects directly to the available AC power wires 7. This connection is conveniently through a conventional AC power receptacle 8 and includes a power wire 9 from the master unit with a conventional plug 10 at the end of this wire to accomodate the receptacle.

The master TR unit performs numerous functions. For example, it is a buffer between the telephone line 1 and the AC power wires 7 so that there is no direct 60 cycle AC electrical connection between the telephone line wires and the power wires. In addition, the master unit imposes a conventional impedance load on the telephone line, via line 6 and the connector 4, so that the telephone line is at all times electrically loaded as required by the central switching system, whether or not the subscriber's master telephone 2 is on the line. The structure and other functions of the master TR unit are more fully described herein.

For purposes of example, two extension stations are shown in FIG. 1, numbered I and II and both are plugged into the AC power wires via conventional power receptacles. Clearly, any number of extension stations can be added and any number can be on the power line at the same time. Since all the extension stations may be the same, except that they generate and transmit different extension carrier frequencies, only extension station number I is described herein in greater detail.

The extension station includes an extension TR unit 15 which couples the extension telephone 12 to the extension station AC power outlet 18. This connection is made by an AC power connecting line 19 from the extension unit with an AC plug 20 at the end of this wire which plugs into the receptacle 18. The extension TR unit 15 and the extension phone 12 are connected by lines 16. These lines, the extension unit and the extension phone are described herein in further detail.

The master and extension TR units 5 and 15 are similar in many respects. Each includes a carrier frequency generator and a carrier frequency receiver. Furthermore, the extension telephone 12 may be a conventional phone which couples to the extension TR unit via lines 16 that carry relatively low level voltage, voice, ring, dial, etc. signals between the extension phone and the telephone line to enable all uses of the extension telephone described herein and all uses which are normally available to a conventional extension telephone.

The extension telephone such as 12 in connection with the subscriber's telephone line as shown in FIG. 1 can be installed easily in any subscribing home or business location where ordinary AC power outlets are available. There is no limitation on the number of extension phones that can be employed on the AC power line at any one time. The only limitation might be the length of the AC power line and the number of loads that can be imposed on the line at any one time which may absorb the carrier frequency signals transmitted between the extension and master stations. This problem can be partially overcome by employing relatively high carrier frequency power and selecting carrier frequencies which are readily detected at the master and extension stations even though they are very substantially attenuated in the AC power system. In addition, suitable filters at the master and extension TR units, are provided to screen out noise from the AC power system and enable clear detection of the carried signal even in the presence of a high level of noise.

Figure 2:
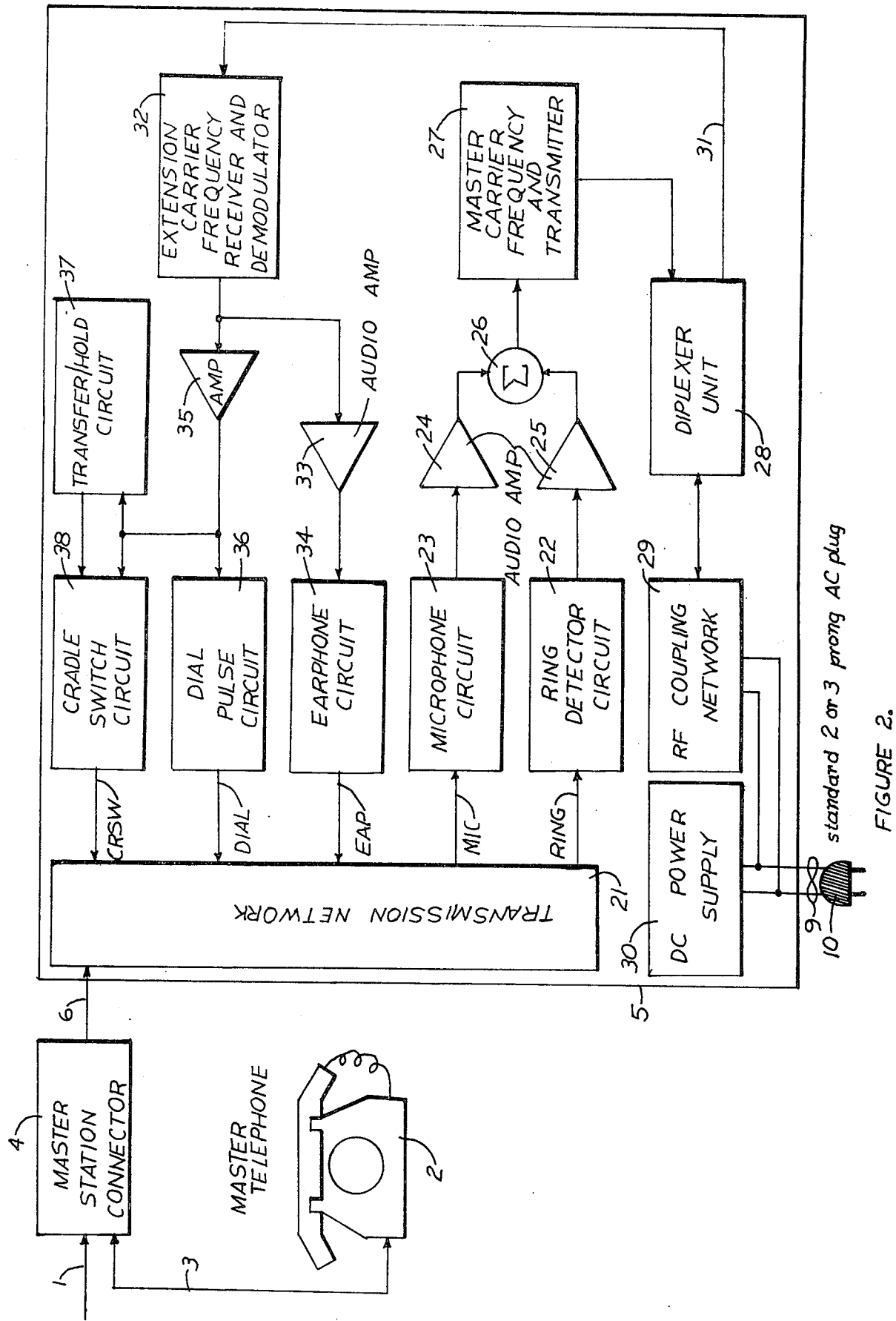
FIG. 2 is an electrical block diagram showing the principal electrical circuits at the master station between the telephone line and the available AC power wires.
Figure 3:
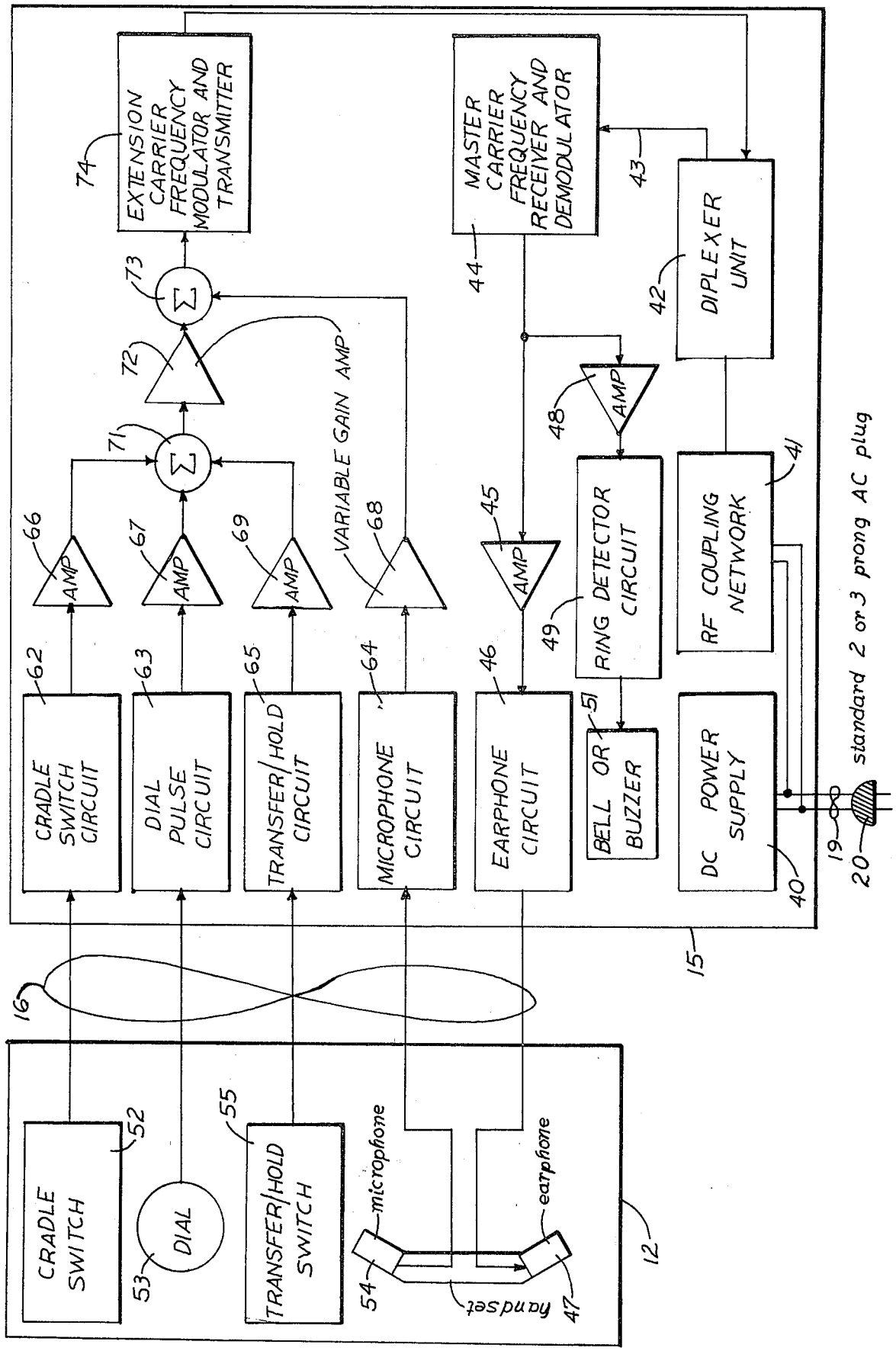
FIG. 3 is an electrical block diagram showing the principal electrical circuits at one of the extension telephone stations which couple the extension telephone to the AC power wires for communication with the telephone line and the on line telephone.

Turning next to FIGS. 2 and 3, there are shown detailed block diagrams of the electrical circuits at the master and extension stations, and particularly the master and extension TR units and the interconnections between these units and the extension telephone. In FIG. 2, the master unit includes a conventional transmission network 21. For purposes of example, this transmission network is identified as an ITT type 75335-1 transmission network sold by International Telephone and Telegraph Company and is shown in greater detail in FIG. 6. The telephone line 1 connects directly to the input of network 21 through the connector 4 and the telephone line 6. As already mentioned, lines 1, 3 and 6 may be a conventional telephone line. Two outputs of the network are denoted Ring and Mic. The Ring output is obtained from terminals G and $L_2$ of the network and carries the telephone ring signals from the telephone line. The Mic output is obtained from terminals R and B of the network and carries the voice signals from the telephone line. The Ring output is fed to the ring detector circuits 22 and the Mic output is fed to the microphone circuits 23. The outputs of these circuits are amplified by variable gain audio amplifiers 24 and 25, respectively, and combined by algebraic summing circuit 26 and fed to the master carrier modulator transmitter 27. In this transmitter, the combined voice and ring signals modulate the master carrier frequency (also referred to herein as the first carrier frequency) and this modulated carrier is fed to diplexer unit 28, where it is filtered and applied to one side of RF coupling network 29 which connects to the AC power wires via power line 9 and plug 10. Thus, the ring and the voice signals on the telephone line, whether they come from a switching station or whether the voice signals come from the master telephone 2, are combined in the master TR unit 5 and modulate the master carrier frequency which is imposed on the available AC power wires at the master station for transmission to the extension station along the power wires.

The same AC power wires also bring signals from the extension station on the extension carrier frequency to the master unit. The signals from the extension station modulate the extension carrier frequency which feeds through plug 10 and power line 9 to the RF coupling network 29 which feeds diplexer unit 28. The diplexer separates the extension carrier from the master carrier frequency and feeds the modulated extension carrier frequency, via line 31, to the extension carrier frequency receiver and demodulator 32.

The signals from the extension station include voice signals, dial signals, extension cradle switch signals and hold/transfer signals. These all appear in the output of demodulator 32. The voice signals are amplified by a band pass audio amplifier 33 which is limited to the band pass of the telephone line system (typically 300 to 3300 Hz). The output of audio amplifier 33 is coupled to the earphone terminals (EaP) of the transmission network via the earphone coupling circuit 34.

The output of demodulator 32 is also fed to amplifier 35 which has a somewhat widerr band that includes the band of amplifier 33, for amplifying cradle switch signals, dial signals and transfer/hold signals from the extension station. The output of amplifier 35 is applied to the Dial Terminals of the transmission network via the dial pulse circuits 36. Where the dial signals from the extension station are pulses (sometimes called dial clicks) as produced by a conventional rotary telephone dial, these dial pulse circuits may consist of a solenoid driving a normally closed switch, the switch being connected to the F and RR terminals of the transmission network, shown in FIG. 7, and the solenoid being driven by the output of amplifier 35. The master unit of this construction and function is shown in greater detail in FIG. 4.

The transfer/hold signals and the cradle switch signal in the output of demodulator 32 are amplified by amplifier 35 and fed to the transfer/hold and cradle switch circuits 37 and 38, respectively. These signals may be combined in the cradle switch circuits and applied to the CrSw terminals in the tip and ring lines of the transmission network shown in FIG. 7. Thus, dialing signals, cradle switch signals and transfer/hold signals originating at the extension telephone are carried to the master unit on the extension carrier frequency over the AC power wires and are received, demodulated and applied to the appropriate terminals of the transmission network. Furthermore, since the transmission network is coupled by line 6 to the subscriber's telephone line 1, the same signals are carried to the telephone line and accomplish the same functions therein as would be accomplished by the same kind of signals from a conventional extension telephone connected directly to the subscriber's telephone line.

The extension station TR unit 15 and extension telephone 12 are shown in FIG. 3 with the major circuits thereof in blocks. The master carrier frequency in the AC power line is fed to the extension coupling network 41 via plug 20 and AC power line 19. From the coupling network 41 the master frequency is fed to the diplexer unit 22 where it is separated from the extension frequency and fed on line 43 to the master carrier frequency receiver and demodulator 44. Thus, the output of the demodulator 44 consists of voice signals equivalent to the voice signals on the subscriber's telephone line 1 and ring signals representative of the ring signals on the subscriber's telephone line 1. These voice signals are amplified by amplifier 45 and applied to the earphone circuits 46 which energize the earphone 47 of extension telephone 12 through one of the lines 16.

Similarly, the ring signal in the output of demodulator 44 is amplified by amplifier 48 and fed to ring detector circuits 49 which control energization of the extension telephone bell or buzzer 51. This bell may be located within the extension TR unit 15 or it may be located in a conventional manner in the extension telephone 12.

The signals which originate at the extension telephone 12 include the extension cradle switch signal from the extension cradle switch 52, the extension dial signals from the extension dial 53, the extension voice signals from the extension microphone or mouthpiece 54 and the extension transfer/hold signal from the transfer/hold switch 55 of the extension telephone. These signals are fed to correspondingly named circuits 62 to 65 in the extension TR unit. The outputs of circuits 62, 63 and 65 are amplified by amplifier 66, 67 and 69, respectively, and the outputs of these are combined by summing circuit 71 and amplified by variable gain amplifier 72. The voice signals from extension microphone 54 are amplified by microphone circuits 64 and fed to variable gain voice band amplifier 68.

Amplifiers 68 and 72 are preferably variable gain amplifiers so that the gains thereof can be adjusted in view of the attenuation of the extension phone carrier frequency in the AC power line between the extension station and master station. These outputs of amplifiers 68 and 72 are combined by summing circuit 73 and fed to extension carrier frequency modulator and transmitter 74. The output of transmitter 74 carrying modulated extension carrier frequency is fed to diplexer unit 42 where in it is separated from the master carrier frequency and then fed to the coupling network 41 for coupling to the AC power wires via power line 19 and plug 20.

Figure 4:
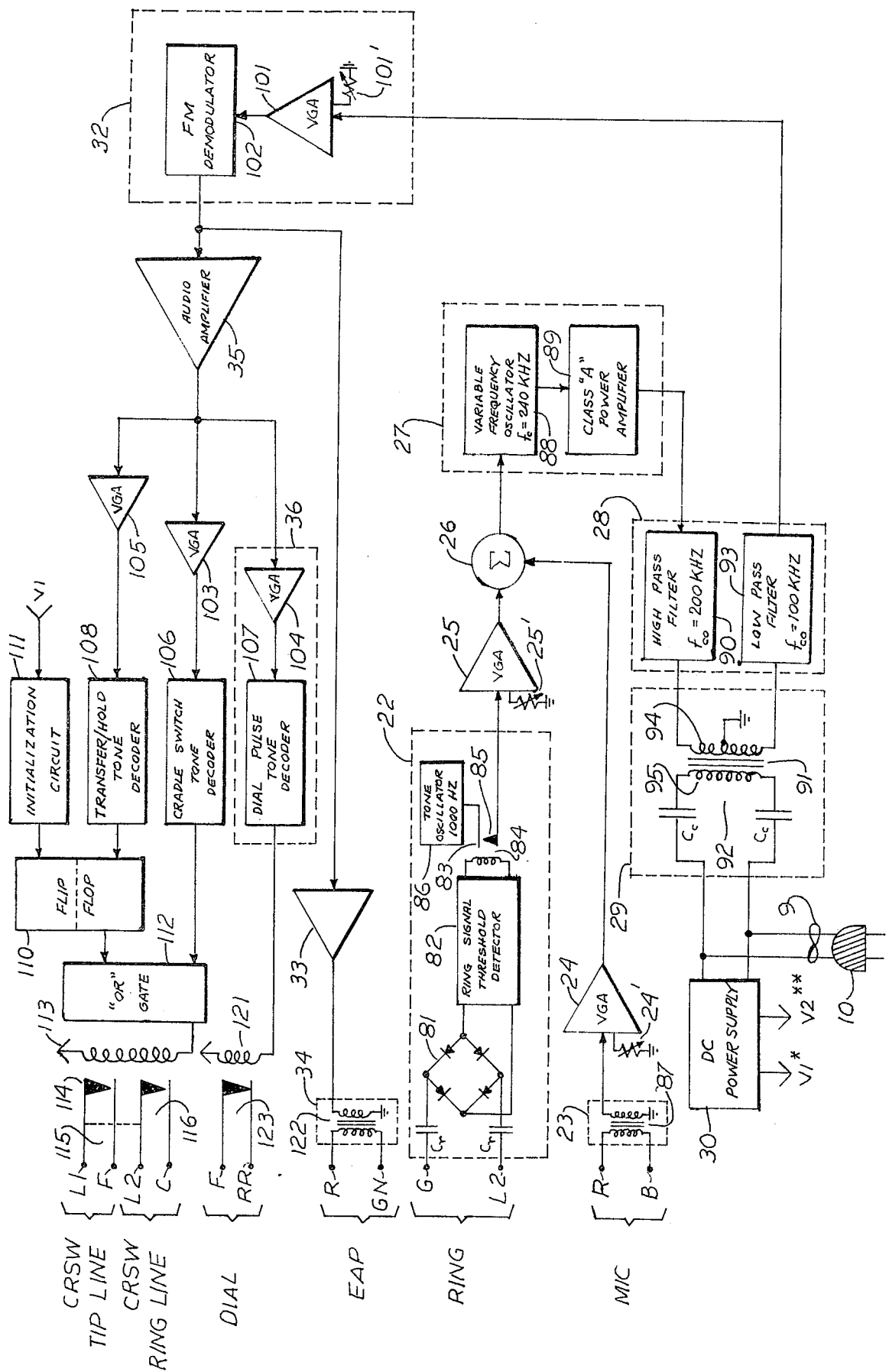
FIG. 4 is a detailed electrical block diagram and schematic of the master station transmit-receive unit.

Additional details of the master TR unit 5 including a few slight variations of the system shown generally in FIG. 2 is shown in FIG. 4. The circuits and components shown in FIG. 4 which are or may be the same as the circuit blocks shown in FIG. 2 which make up the master unit, bear the same reference numbers. FIG. 4 does not show the transmission network 21, but rather shows in detail the terminals of the conventional transmission network of FIG. 7 as it may be used in the master unit. This particular transmission network is identified as the ITT type 75335-1 which is part of a great many conventional telephone handsets in current use.

The outputs of transmission network 21 shown in FIG. 4 are the Ring terminals and the Mic terminals. The Ring terminals are terminals G and $L_2$ to which the ring detector circuits 22 in the master unit are connected. These ring detector circuits include a full wave rectifier diode bridge circuit 81 to which the terminals G and $L_2$ of the transmissioin network are coupled via capacitors denoted Cr. The output of this bridge is connected to the input of the ring signal threshold detector 82 which includes a smoothing filter and the output of this detector is applied across the coil 84 of a normally opened solenoid relay switch 83. The switch in this relay is denoted 85. When this switch 85 closes it connects the output of the 1,000 Hz tone oscillator 86 to the input of variable gain amplifier 25. This amplifier preferably operates over a 10% band centered at a convenient ring tone frequency such as 1,000 Hz. The gain of this amplifier is controlled by variable potentiometer 25'.

The Mic terminals of the transmission network, denoted R and B connect across the primary coil of transformer 87 which is the equivalent of the microphone circuit 23 shown in FIG. 2. The secondary of this transformer connects to the input of variable gain amplifier 24 which preferably operates over the voice frequency range 300 to 3300 Hz. The gain of this amplifier is controlled by variable potentiometer 24'.

The outputs of amplifiers 24 and 25 are fed to algebraic summing circuits 26 which combine the ring tone signal of 1,000 Hz and the voice signals which lie in the band 300 to 3300 Hz and these combined signals are fed to the master carrier frequency modulator and transmitter 27. This modulator consists of a variable frequency oscillator 88 which is centered at a frequency substantially higher than the telephone line frequencies and higher than frequencies normally appearing in the AC power wires. For example, this frequency may be 240 KHz. The output of this oscillator is amplified by class A power amplifier 89 and fed to the high pass filter 90 in diplexer unit 28. This high pass filter has a 3 db cut off frquency of 200 kHz. Thus, the output of high pass filter 90 is the master RF or master carrier frequency which is frequency modulated by the voice and ring tone signals derived from the subscriber's telephone line 1. This modulated master carrier frequency is coupled to the AC power line by the RF coupling network 29 which may consist of an RF transformer 91 which couples to the AC line 9 by capacitors Cc, denoted 92.

The RF coupling network 29 functions in both directions. That is, it couples the master carrier frequency from the transmitter 27 to the AC power line and couples the extension carrier frequency from the AC power line to the low pass filter 93 in the diplexer unit 28. In the direction from the master carrier transmitter 89 to the AC power line, the primary coil 94 of RF transformer 91 includes a center tap to ground and the capacitances 92 connect the secondary coil 95 of this transformer to the AC power wires.

The extension carrier frequency, like the master carrier frequency, is far higher than the normal operating band of the telephone line and is higher than frequencies normally appearing in any significant amplitude in the AC power wires. However, the extension carrier frquency differs sufficiently from the master carrier frequency so that they can be discriminated readily one from the other. For example, if the master frequency is centered at 240 kHz, then the extension carrier frequency is conveniently centered at 90 kHz. Accordingly, the 3 db cut off frequency of low pass filter 93 is 100 kHz. The output of this filter (which is extension carrier frequency modulated by the various signals generated at the extension telephone), is fed to the extension carrier frequency receiver and demodulator 32. The receiver portion of this consists of a variable gain amplifier 101 and an FM demodulator circuit 102. The gain of amplifier 101 is controlled by variable potentiometer 101'.

The output of demodulator 102 consists of the various signals generated at the extension telephone. These include the voice signals in the frequency range 300 to 3300 Hz and separate narrow band tones, one carrying the extension cradle switch signal, another the dial pulse signals and, a third the transfer/hold signal. The generation of these separate narrow band tones to carry each of these different signals is explained more fully herein with respect to FIG. 6 which shows the extension TR unit 15 wherein these tones are generated. For example, the cradle switch signal may be carried by a narrow band tone centered at 100 Hz, the dial pulse signals may be carried by a narrow band tone centered at 3000 Hz and the transfer/hold signals may be carried by a narrow band tone centered at 2,000 Hz.

These tones are separated in the output of amplifier 35 by variable gain amplifiers 103, 104 and 105 which operate over the narrow bands centered at 100 Hz, 3,000 Hz and 2,000 Hz, respectively, and so the outputs of these amplifiers are limited to the cradle switch signal, the dial pulse signals and the transfer/hold signal, respectively and each is represented by a different tone. These tones are decoded by detecting the envelopes of these tones which represent the associated signals. For this purpose, detectors 106, 107 and 108 are provided which produce in the output thereof the cradle switch, transfer/hold and dial pulse signals, respectively.

The transfer/hold signal in the output of decoder 108 is fed to the flop input of flip-flop circuit 110. This flip-flop circuit is a double input, bistable multivibrator of conventional construction and is triggered by a sharply rising voltage level (a spike pulse) at either input. For purposes of example, the flip stage is the "zero" state and the flop is the "one" state of this multivibrator and the output is from the flop or one state. This output is a zero or one voltage level and is fed along with the "zero" or "one" voltage level in the output of the cradle switch decoder 106 to OR gate 112 which energizes the solenoid 113 of normally open, switch relay 114.

Figure 7:
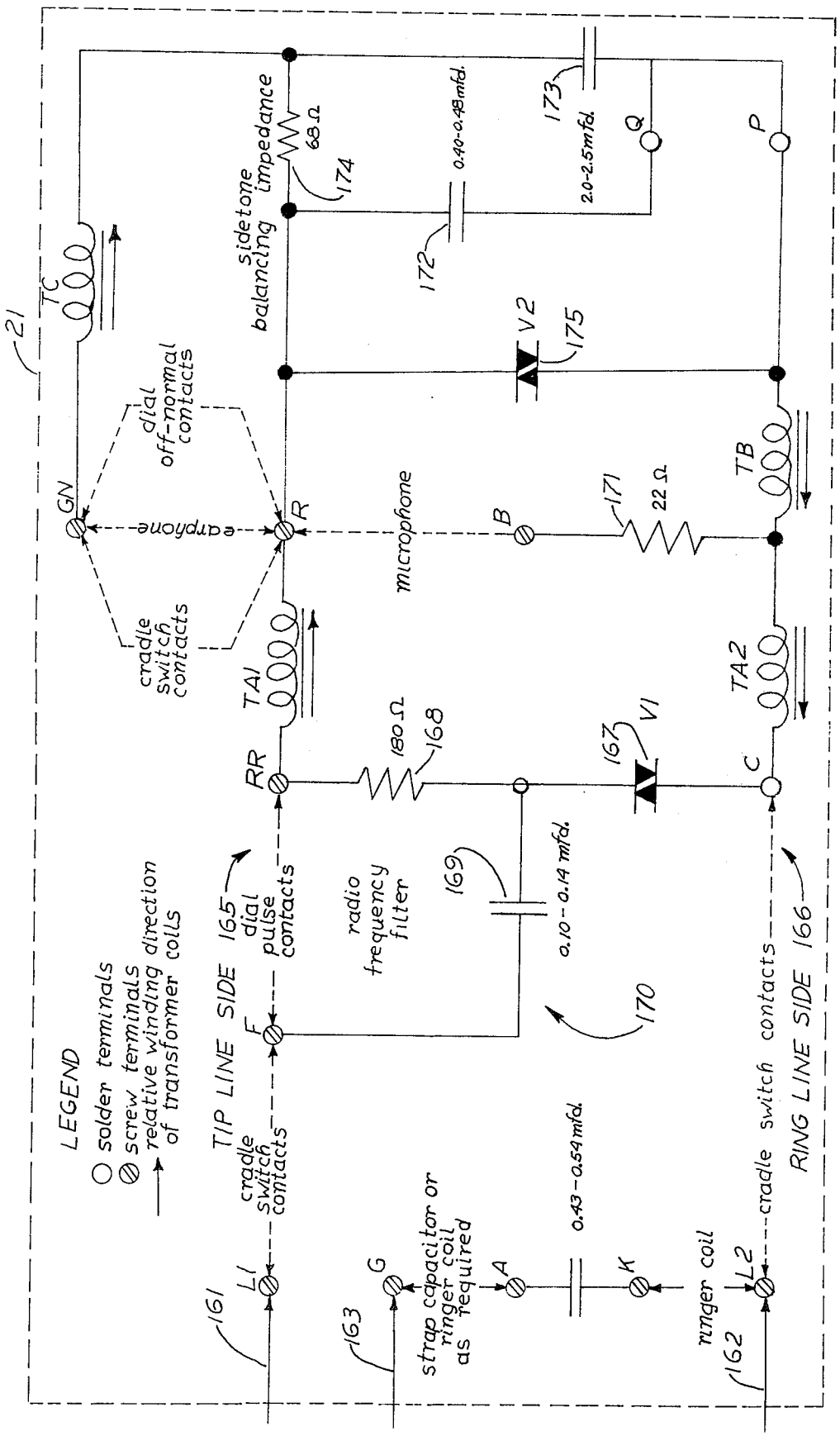
FIG. 7 is an electrical schematic of a conventional battery telephone transmission network of the type used in many conventional telephone handsets and which is for example, the ITT type 75335-1 network, and is suitable for use in the master station transmit-receive unit.

The two switches 115 and 116 of relay 114 connect to the cradle switch (CrSw) terminals of the transmission network 21 in the tip and ring lines thereof. These terminals, shown in FIG. 7, are $L_1$ and F which connect to switch 115 and $L_2$ and C which connect to switch 116. Hence, a "one" signal level in the output from flip-flop 110 or cradle switch tone decoder 106 closes switches 115 and 116 and makes the master unit 15 responsive to signals on the subscriber's telephone line 1.

The flip or "zero" stage of flip-flop 110 responds to spike pulses from initiation circuit 111. These spike pulses are derived either from the power supply voltage $V_1$ from the DC power supply 30 when the master TR unit 15 is turned on (such as when it is plugged into the AC power line), or from the initiation of a "one" signal level in the output of cradle switch tone decoder 106. Thus, following turn on of the master TR unit or lifting the extension telephone handset from its cradle, the flip-flop is set to its "zero" state.

Figure 5:
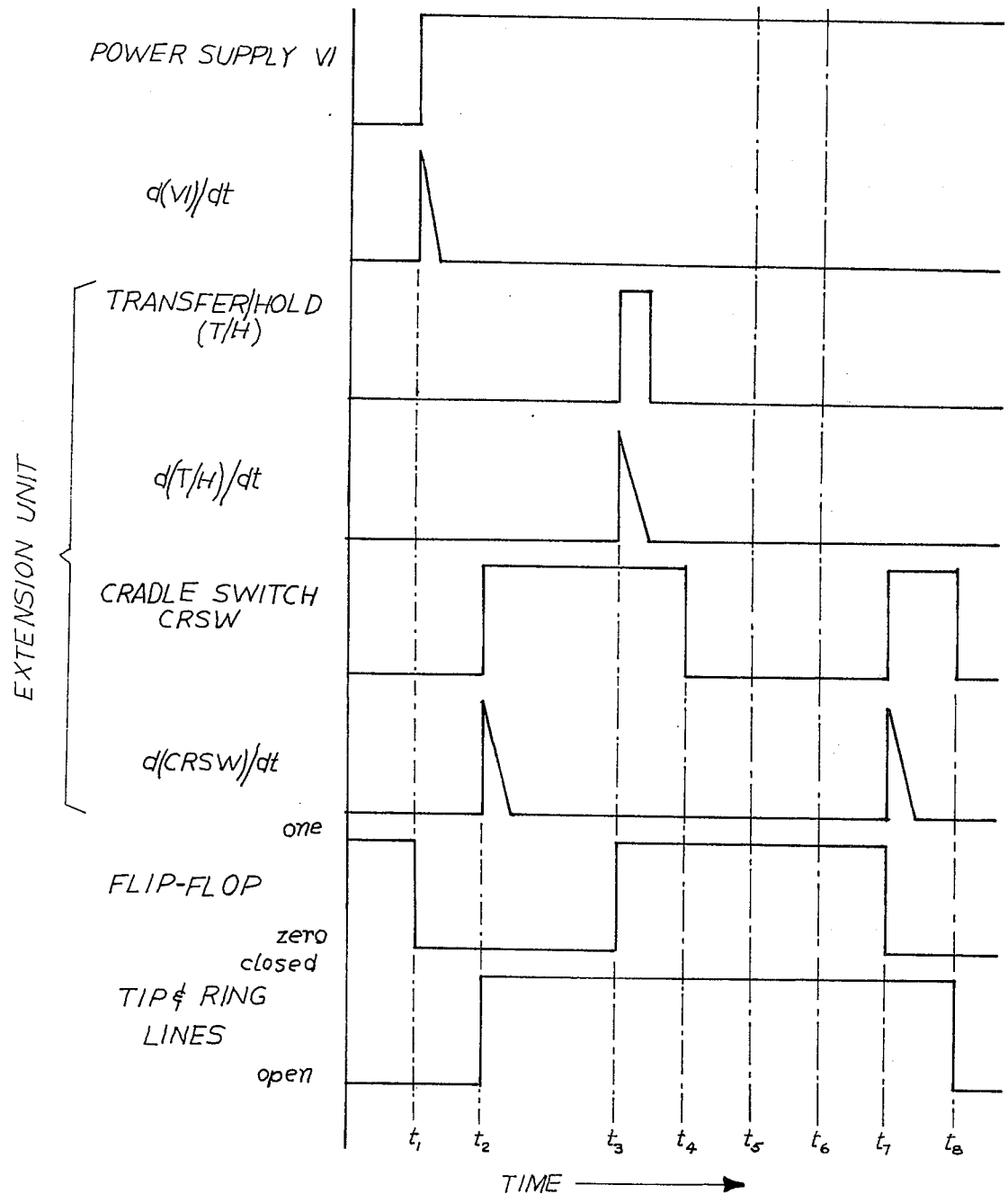
FIG. 5 is a diagram showing the sequence of cradle switch, transfer/hold and other signals that initiate coupling of the system to the subscriber's telephone line.

Typical operation of the relay 114 to control coupling of the tip and ring lines of network 21 to the subscriber's telephone line, is illustrated by the diagrams of FIG. 5. This shows the types of signals produced by decoders 106 and 108 and by circuit 111, and the states of flip-flop 110 and the tip and ring line connections to the telephone line at a number of typical operating events. For example:

At $t_1$ — the master station is turned on producing power supply voltage $V_1$ which causes a spike output pulse from circuit 111 that sets the flip-flop 110 to the "zero" state.

At $t_2$ — the extension handset is lifted from its cradle.

At $t_3$ — the extension transfer/hold button is momentarily depressed.

At $t_4$ — the extension handset is returned to its cradle.

At $t_5$ — the extension TR unit is unplugged from the AC power line — (and is moved).

At $t_6$ — the extension TR unit is plugged into the AC power line.

At $t_7$ — the extension handset is lifted from its cradle.
At $t_8$ — the extension handset is returned to its cradle.

This sequence of events shows that the master unit transmission network 21 is coupled to the subscriber's telephone line upon answering the extension phone and remains coupled after the transfer/hold button is actuated even when the extension is unplugged from the system, moved and then plugged in again.

The dial pulse circuits 36 in the master unit in FIG. 4 consist of variable gain amplifier 104 amplifying the signals from amplifier 35 and the dial pulse decoder (envelope detector) 107. The amplifier 104 operates over a narrow band centered at the 3,000 Hz dial pulse tone and selectively amplifies only the dial pulse tones appearing in the output of amplifier 35. The decoded dial pulse tone, consisting of dial pulses, appears in the output of this decoder and is applied to the solenoid 121 of relay switch 122. The switch 123 in this relay is normally closed and so each dial pulse causes the switch 123 to momentarily open. Since this switch connects to the Dial terminals F and RR of the transmission network 21, the dial pulses are applied to the network and from the network to the subscriber's telephone line 1 via the master connector 4. Thus, all signals originating at the extension telephone are carried to the master TR unit over the AC power wires and decoded to suitable form for coupling to the conventional telephone line transmission network that connects to the subscriber's telephone line. In this manner, the extension telephone is made as effective as a conventional telephone on a conventional extension of the subscriber's telephone line. More particularly, the extension telephone described in this invention is capable of answering and receiving incoming telephone calls and conducting conversations with the incoming call. It can place a call on the telephone line and initiate a hold position so that the same call can be answered also on the master telephone or on another extension telephone or so that the extension phone answering the call can be unplugged, moved and plugged in again to continue the call. Furthermore, all these functions can be performed with or without the master telephone on the telephone line and no action has to be taken with regard to the master telephone in order to perform these functions.

Figure 6:
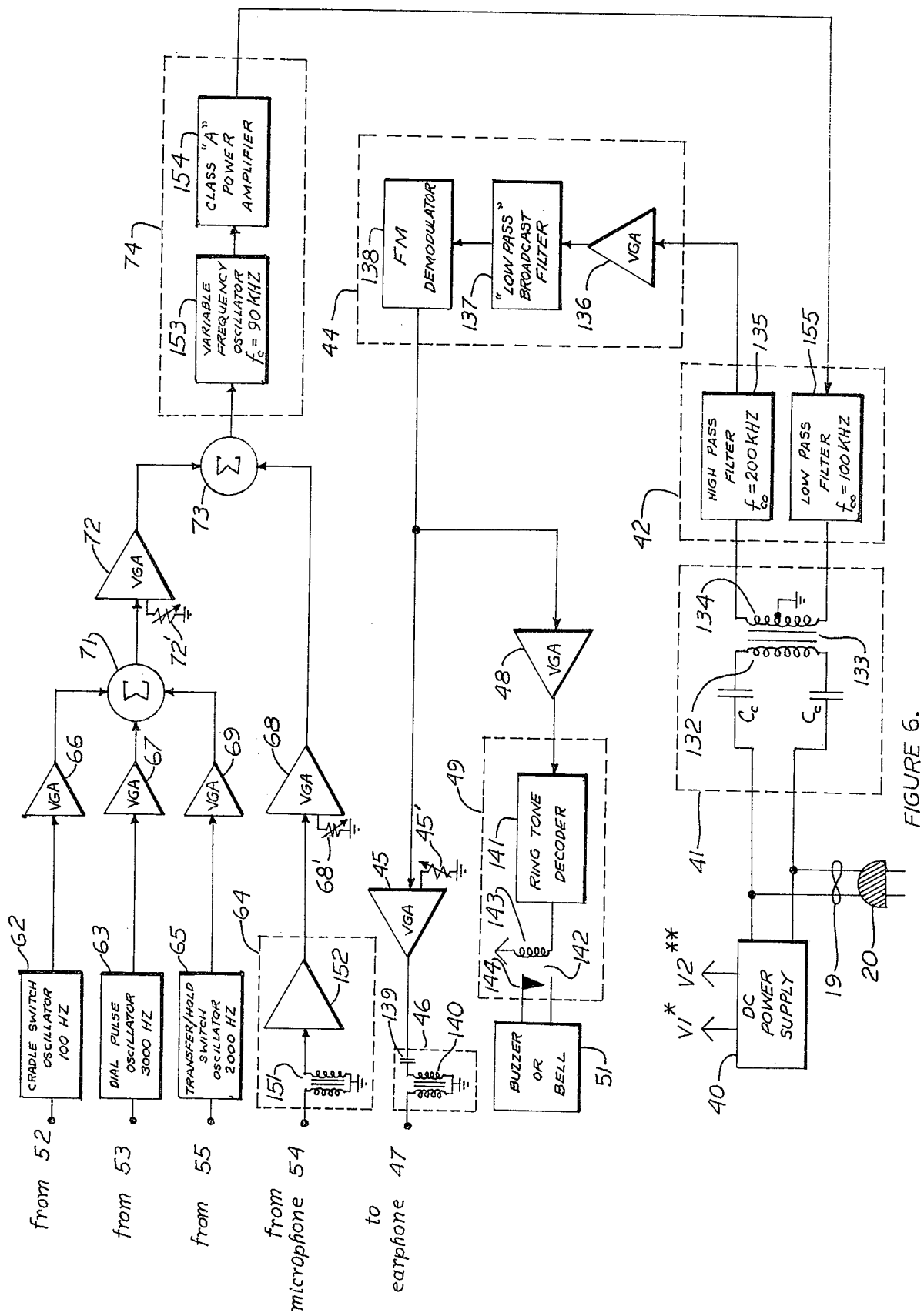
FIG. 6 is a detailed electrical block diagram and schematic of the extension station transmit-receive unit.

Additional details of the extension station TR unit 15 are shown in the block diagram, electrical schematic of FIG. 6. As shown in this figure, the master carrier frequency is coupled from the AC power line through the RF coupling network 41 which may consist of two capacitances 131 connected to the primary 132 of an RF transformer 133 in the direction of incoming master carrier frequency. The secondary 134 of this transformer, in the same direction, includes a center tap to ground. The master carrier frequency from this transformer feeds through high pass filter 135 centered at 200 KHz to the master carrier frequency receiver and demodulator 44. This receiver and demodulator consists of a variable gain amplifier 136, a low pass broadcast filter 137 and FM demodulator 138. The variable gain amplifier 136 has a narrow frequency band of operation centered at about 240 KHz.

Since the signals that modulate the master carrier frequency consist of the 1,000 Hz ring tone generated by the tone oscillator 86 in the master unit, and the voice signals from the Mic terminals of the transmission network in the master unit, the output of FM demodulator 138 consists of these same voice signals and the 1,000 Hz ring tone signal. The voice signals in this output are amplified by variable gain amplifier 45 which energizes the earphone circuit 46 that in turn, energize the earphone 47 of the extension telephone. The circuit 46 may include, for example, a capacitance 139 in series with inductance 140.

The ring tone signal in the output of demodulator 138 is amplified by variable gain amplifier 48 which drives the ring and tone decoder (ring and tone envelope detector) 141 that energizes the coil 143 of relay switch 142. The switch 144 of relay 142 is normally open and closes when the ring signal is present in the output of the decoder. When this switch closes, it turns on the buzzer or bell 51.

The extension telephone signals, excluding the voice signals from the microphone 54, are each converted to a representative tone so that each can be distinguished from the other at the master unit by the distinguishing tone. In the extension unit, these tones modulate the extension carrier frequency which is then transmitted over the AC power wires to the master unit. These identifying tones are preferably single frequencies, all within the voice frequency band width. That is, they fall within the 30 to 3300 Hz band. Furthermore, these tones are selected in view of the signal which they are to convey and are separated substantially from each other to insure there is no overlap. With this in mind, it is convenient if the cradle switch signal is carried by a tone at about 100 Hz and the dial pulses are carried by a tone at the other end of the available band, such as 3,000 Hz. This leaves the transfer/hold signal from the extension telephone to be carried by a tone between the other two or about 2,000 Hz. Thus, the cradle switch, dial and transfer/hold circuits 62 and 65 shown in FIG. 3 may each be an oscillator which is turned on whenever the associated signal is present. For example, the cradle switch circuit 62 may be a 100 Hz oscillator which is turned on whenever the cradle switch opens. The dial circuit 63 is a 3,000 Hz oscillator which is turned on at each dial pulse or click and the transfer/hold circuit 65 is a 2,000 Hz oscillator turned on each time the transfer/hold switch is actuated. These oscillators feed amplifiers 66, 67 and 69, respectively and the outputs of these amplifiers are combined by algebraic summing circuit 71.

The voice signals from the extension phone microphone 54 are fed to the microphone circuit 64 which may consist of an input inductive impedance 151 and amplifier 152. The band of operation of this amplifier is preferably at least from 300 to 3300 Hz which is in the voice frequency range.

Variable gain amplifiers 72 and 68 feed the tone signals and the voice signals to algebraic summing circuit 73 which in turn, controls the variable frequency oscillator 153 in the extension carrier frequency modulator and transmiter 74. oscillator 153 has a center frequency of about 90 KHz and so the upper sideband output of this oscillator is in the range of 90 to 100 KHz. This sideband is amplified by class A power amplifier 154 and fed through low pass filter 155 in the diplexer unit 42. This low pass filter rhas a cut off frequency of 100 KHz and so it passes the extension carrier sideband to the RF coupler 41 that feeds the sideband to the AC power wires via the AC plug 20.

The variable gain amplifiers 72 and 68 each have a control potentiometer 72' and 68', respectively, for controlling the gain. These potentiometers may be preset or they may be varied at installation or even during use as necessary to control the amplitude of the tone and voice signals that modulate the extension carrier frequency. Variable gain amplifiers 45 and 48 also include variable potentiometers 45' and 48', respectively, for the same purpose.

A typical ITT type 75335-1 transmission network 21 is shown in detail in FIG. 7. This network connects directly to the subscriber's telephone line as shown, the telephone line being represented by the tip and ring wires 161 and 162 and ground wire 163. The first set of terminals, which are across these lines are the Ring terminals consisting of G, A, K and $L_2$. Of these, G connects to 163, and $L_2$ connects to 162 and G and $L_2$ connect also to the ring detector circuit 22 in the master unit. The CrSw terminals $L_1$ and F in the tip line side 165 of the network connect to the normally open switch 115 of relay 114. Similarly, the CrSw terminals $L_2$ and C in the ring line side 166 of the network connect to switch 116 in the same relay. Thus, when this relay is energized by the cradle switch signal or the transfer/hold signal, terminals $L_1$ and F on the tip side and terminals $L_2$ and C on the ring side of the network are short circuited.

The dial pulse or dial click signals appearing in the output decoder 107 in the master unit cause normally closed switch 123 of relay 122 to open then close with each pulse. The terminals of this switch connect to the Dial terminals in tip line side of the transmission network and so these dial pulses are produced in the telephone line when these terminals are opened and closed by the switch 123.

A radio frequency filter 170, also called an equilizer circuit across the tip and ring sides of the network includes a varistor 167 in series with the combination of resistor 168 and capacitor 169. The capacitor here supressed dial pulse transients to prevent them from causing radio interference and the resistor and the varistor form the line equilizer that acts as a shunt on short loops to limit the power transmitted by the transmission network to the telephone line and vice versa. If this power level is too high, cross talk problems occur.

The induction coil $TA_1$-TC in the tip line side and the induction coil $TA_2$-TB in the ring line side of the network are each split to balance the impedance on each side of the line. These inductances are split on each side of the Mic terminals R and B to which the microphone transformer 87 connects, as shown in FIG. 4 and imposes a load equivalent to the carbon microphone of a conventional telephone. This transformer 87 and the resistor 171 make up the network transmitter impedance of what is sometimes called the anti-sidetone circuit. The capacitors 172 and 173 and resistor 174 make up the anti-sidetone balancing impedance. Varistor 175 compensates for changes in line impedance so that desired conditions are maintained to control sidetone levels.

The earphone circuit 34 connects to the earphone terminals GN and R of the transmission network. This circuit consists of the transformer 34 at the output of variable gain amplifier 33 that amplifies voice signals derived from the extension telephone. This transformer provides an impedance equivalent to the impedance of a conventional telephone earphone, and that impedance makes up the receiver leg of the transmission network. Varistor 175 limits the output level of the receiver leg to levels well below those which might be objectionable to the user.

Thus, the transmission network can be the same as the transmission network in a conventional telephone and all the input and output terminals of that network are provided impedances which are equivalent to those that are connected to such a network as in a conventional telephone. As a result, the signal levels and impedances imposed on the subscriber's telephone line are in all respects conventional and not particularly distinguishable from the signal levels and impedances that would be imposed by a single master telephone of conventional design connected directly to the telephone line.

The embodiments of the present invention described herein include the complete system of master TR unit and conventional master telephone on the subscriber's telephone line and one or more extension telephones each including an extension telephone and extension TR unit transmitting a different extension carrier frequency. Clearly, various modifications of this complete system or portions of the system may be employed to form other embodiments of the invention all contemplated by and within the spirit and scope of the invention. Furthermore, numerous substitutions or rearrangements of the components and the sequence of operation of the components in these systems may be made without departing from the spirit and scope of the invention as set forth in the appended claims.

What is claimed is:

1. A power line telephone extension system for carrying signals between, (1) a subscriber's telephone line of a conventional telephone communication system, wherein a separate telephone line is provided from a central switching system at one location to each subscriber at the subscriber's location and each subscriber telephone line includes at least two wires, the ring line and the tip line and, (2) the same subscriber's extension telephone, over available power wires at the subscriber's location and power wire connector outlets, also at the subscriber's location, comprising at the subscriber's location:

a subscriber master location near said subscriber telephone line and near a power wire connector outlet and a subscriber extension telephone location near a power wire connector outlet; and at the subscriber's master location:

a voice signal detector circuit having its input electrically connected to the tip line for detecting voice signals on the subscriber's telephone line, a ring detector circuit having its input electrically connected to the ring line for detecting ring signals on the subscriber's telephone line, and a master output electrically reactive coupling device electrically connected between the outputs of said voice signal and ring detector circuits and said power connector outlet near the master location, whereby the power wires carry the detected telephone line signals from the master location to the extension location thereon; and at the extension location:

an extension telephone, receiver means for said extension telephone, and means for coupling said voice and ring telephone line signals from the extension location to said extension telephone receiver means;

whereby the extension telephone receives the voice and ring signals from the telephone line.

2. A power line extension system as in claim 1, further including, at the extension location:

a power supply providing power to the extension telephone, whereby the extension telephone generates extension telephone signals, and means for electrically coupling said extension telephone signals to said power connector outlet near the extension location; and at the master location:

receiver means, a master receiver electrically reactive coupling device, electrically connected between said power connector outlet near the master location and the master receiver means, and means for electrically coupling said received extension signals from the master receiver means to the telephone line;

whereby the extension telephone both receives signals from the telephone line and sends signals to the telephone line.

3. A power line telephone extension system for carrying signals between, (1) a subscriber's telephone line of a conventional telephone communication system, wherein a separate telephone line is provided from a central switching system at one location to each subscriber at the subscriber's location and each subscriber's telephone line includes at least two wires, the ring line and the tip line and, (2) the same subscriber's extension telephone over available power wires at the subscriber's location and power wire connector outlets at the subscriber's location, comprising at the subscriber's location:

a subscriber master location near said subscriber telephone line and near a power wire connector outlet, and a subscriber extension telephone location near a power wire connector outlet; and at the subscriber master location:

a voice signal detector circuit having its input electrically connected to the tip line for detecting voice signals on the subscriber's telephone line, a ring detector circuit having its input electrically connected to the ring line for detecting ring signals on the subscriber's telephone line, means for producing a master carrier frequency, modulating means responsive electrically directly to the outputs of said voice signal and ring detector circuits for modulating the master carrier frequency, producing modulated master carrier signals, and a master output electrically reactive coupling device electrically connected between the output of said modulating means and said power connector outlet near the master location, whereby the power wires carry the modulated master carrier signals from the master location to the extension location thereon; and at the extension location:

an extension telephone, receiver means for said extension telephone, means for electrically coupling said modulated master carrier signals from said power connector outlet near the extension location to the extension telephone receiver means, means for demodulating said received modulated master carrier signals and detecting said telephone line voice and ring signals in the output thereof, and means for electrically coupling said detected telephone line voice and ring signals to the extension telephone;

whereby the extension telephone receives voice and ring signals from the telephone line.

4. A power line extension telephone system as in claim 3 wherein, at the extension location:

an alarm is provided that responds to said detected ring signal, and an earphone is provided that responds to said detected voice signals, whereby the detected ring signal activates the alarm and when the extension telephone is answered, the detected voice signals energize the earphone.

5. A system as in claim 3 wherein, at the master location:

a substantially conventional telephone transmission network connects to the telephone line ring and tip lines and imposes a load impedance on the telephone line compatible with the telephone communication switching system, the input of the voice signal detector circuit electrically connects to the tip line of the transmission network, and the input of the ring detector circuit electrically connects to the ring line of the transmission network, whereby the voice and ring signals from the telephone line are coupled from the transmission network to the means for modulating the master carrier frequency called the master carrier frequency modulator, wherein the said telephone line signals modulate the master carrier frequency and the modulated master carrier frequency signals are electrically coupled to the power connector outlet near the master location.

6. A system as in claim 5 wherein, at the master location:

means are provided for combining the detected ring signal and voice signal and feeding the combination to the master carrier frequency modulator.

7. A system as in claim 6 wherein, at the extension location:

the extension telephone includes a bell alarm and a handset carrying an earphone the master carrier frequency is demodulated by the master carrier frequency demodulator, means are provided for detecting the ring signal from the output of the master carrier frequency demodulator, means are provided for energizing the extension telephone bell in response to said detected ring signal, and means are provided for energizing the extension telephone earphone in response to the voice signals in the output of the master carrier frequency demodulator.

8. A system as in claim 7 wherein, at the extension location:

the extension telephone includes a handset cradle switch, means are provided for energizing the extension bell in response to said detected ring signal in the output of the master carrier frequency demodulator when the extension cradle switch is actuated by the handset, and means are provided for energizing the extension earphone by the voice signals in the output of the master carrier frequency demodulator when the extension cradle switch is not actuated by the handset.

9. A system as in claim 8 wherein, at the master location:

the telephone transmission network, the voice signal and ring signal detector circuits, the means for combining the detected ring and voice signals, the master carrier frequency modulator, and the master output electrically reactive coupling device which couples the master carrier signals to the power connector outlet near the master location are contained in a unitary package, and the extension receiver means, the means for coupling master carrier signals from the power connector outlet near the extension location, the master carrier frequency demodulator, the extension telephone bell and the extension telephone earphone are contained in a unitary package at the extension location.

10. A system as in claim 5 wherein, at the master location:

means are provided responsive to the detected ring signal from the ring detector circuit for initiating a ring tone signal in response thereto, means are provided for combining the ring tone signal and the voice signals from the voice signal detector circuit, the master carrier frequency modulator responds to said combined signals, producing in the output thereof said modulated master carrier frequency, modulated by ring tone or voice signals; and at the extension location:

means are provided responsive to the output of the master carrier frequency demodulator for detecting said ring tone signal, and the output thereof initiates energization of the extension telephone bell.

11. A system as in claim 10 wherein, the frequency of the ring tone lies within the frequency of the telephone line voice signal frequency band, the ring tone detector is tuned narrowly to the tone frequency, and the threshold of said ring tone detector is sufficiently high to exclude any portion of the voice signals from initiating energization of the extension telephone bell.

12. A system as in claim 3 wherein, the master carrier frequency modulation by the signals carried on the telephone line is frequency modulation, and the master carrier frequency center frequency is substantially higher than the telephone line operating frequency band.

13. A power line telephone extension system for use with a conventional subscriber telephone line of a conventional telephone communication system, wherein a separate telephone line is provided from a central switching system at one location to each subscriber at the subscriber's location and a subscriber telephone line includes at least two wires, the ring line and the tip line, said system serving to transmit signals to the subscriber's telephone line from an extension telephone at the subscriber's location over available power wires and power wire connector outlets, also at the subscriber's location, comprising, at the subscriber's location:

a subscriber master location near said subscriber telephone line and near a power wire connector outlet, and a subscriber extension telephone location near a power wire connector outlet; and at the extension location:

an extension telephone, a source of electrical power for the extension telephone, whereby the extension telephone produces voice and dial signals when it is used by the subscriber, means for producing an extension carrier frequency, means for modulating said extension carrier frequency by said extension dial and voice signals producing modulated extension carrier signals, and means for coupling said modulated extension carrier signals to said power connector outlet near the extension location, whereby the power wires conduct said modulated extension carrier signals from the extension location to the master location; and at the master location:

a master receiver, an extension carrier frequency demodulator, a master receiver electrically reactive coupling device electrically connected between said power connector outlet near the master location and said extension carrier frequency demodulator, means for detecting in the output of said extension carrier frequency demodulator said extension dial signals and voice signals, and means for electrically coupling said detected extension dial signals and voice signals to said subscriber tip line;

whereby calls represented by the extension dial signals are placed to the telephone communication system by the extension telephone and voice signals initiated by the extension telephone are conducted by the telephone line.

14. A power line telephone extension for carrying signals between, (1) a subscriber's telephone line of a conventional telephone communication system, wherein a separate telephone line is provided from a central switching system at one location to each subscriber at the subscriber's location and each subscriber telephone line includes at least two wires, the ring line and the tip line and, (2) the same subscriber's extension telephone, over available power wires at the subscriber's location and power wire connector outlets, also at the subscriber's location, comprising, at the subscriber's location:

a subscriber master location near said subscriber telephone line and near a power wire connector outlet, and a subscriber extension telephone location near a power wire connector outlet; and at the subscriber's master location:

a voice signal detector circuit having its input electrically connected to the tip line for detecting voice signals on the subscriber's telephone line, a ring detector circuit having its input electrically connected to the ring line for detecting ring signals on the subscriber's telephone line, means for producing a master carrier frequency, modulating means responsive electrically directly to the outputs of said voice signal and ring detector circuits for modulating the master carrier frequency producing modulated master carrier signals, and a master output electrically reactive coupling device electrically connected between the output of said modulating means and said power connector outlet near the master location, whereby the power wires carry the modulated master carrier signals from the master location to the extension location thereon; and at the extension location:

an extension telephone, extension telephone receiver means, means for coupling said modulated master carrier signals from said power connector outlet near the extension location to the extension receiver means, means for demodulating said received modulated master carrier signals, and means for coupling said demodulated master signals to the extension telephone, whereby the extension telephone receives signals from the telephone line, a source of electrical power for the extension telephone, whereby the extension telephone produces voice and dial signals when it is used by the subscriber, means for producing an extension carrier frequency, means for modulating said extension carrier frequency by the extension dial and voice signals producing modulated extension carrier frequency signals, and means for coupling said modulated extension carrier signals to said power connector outlet near the extension location, whereby the power wires carry said modulated extension carrier signals from the extension location to the master location; and at the master location:

a master receiver, an extension carrier frequency demodulator, a master receiver electrically reactive coupling device electrically connected between said power connector outlet near the master location and said extension carrier frequency demodulator, means for detecting said extension dial signals and voice signals in the output of said demodulator, and means for electrically coupling said detected extension dial signals and voice signals to said subscriber tip line, whereby calls are received from and placed on the telephone line by the extension telephone and voice signals initiated by the extension telephone are carried on the telephone line.

15. A system as in claim 14 wherein, the master and extension carrier frequencies are substantially different and both are substantially higher than the frequency band of operation of the telephone line.

16. A system as in claim 14, further including, at the extension location:

means for generating an extension telephone cradle switch signal, and means for modulating said extension carrier frequency by the cradle switch signal, whereby the modulated extension carrier frequency includes dial signals, voice signals and the cradle switch signal; and at the master location:

switches in the tip and ring lines, control means for said tip and ring line switches, an extension cradle switch detector circuit for detecting the extension cradle switch signal in the output of said extension carrier frequency demodulator and means for coupling the detected extension cradle switch signal to said tip and ring line switch control means for controlling said switches.

17. A system as in claim 16, further including, at the extension location:

means for generating an extension telephone transfer/hold signal and means for modulating said extension carrier frequency by the transfer/hold signal, whereby the modulated extension carrier frequency includes the cradle switch, dial, voice and transfer/hold signals; and at the master location:

switches in the tip and ring lines, control means for said tip and ring line switches, an extension transfer/hold detector circuit for detecting the extension transfer/hold signal in the output of said extension carrier frequency demodulator, and means for coupling the detected extension transfer/hold signal to said tip and ring line switch control means for controlling said switches.

18. A system as in claim 17 wherein, at the master location, means are provided so that, the reproduced cradle switch and transfer/hold signals cause the electrical circuits to couple directly to the telephone line when:

a. the cradle switch signal is present b. following the simultaneous occurrance of the cradle switch signal and the transfer/hold signal, the cradle switch signal ceases and said coupling to the telephone line continues until the cradle switch signal commences again and then ceases again.

* * * * *